(12) United States Patent
Uribe-Etxebarria Jimenez

(10) Patent No.: US 11,405,742 B2
(45) Date of Patent: Aug. 2, 2022

(54) DIGITAL ASSISTANT

(71) Applicant: SHERPA EUROPE, S.L., Bizkaia (ES)

(72) Inventor: Xabier Uribe-Etxebarria Jimenez, Bizkaia (ES)

(73) Assignee: SHERPA EUROPE, S.L.

( * ) Notice: Subject to any disclaimer, the term of this patent is extended or adjusted under 35 U.S.C. 154(b) by 0 days.

(21) Appl. No.: 17/050,859

(22) PCT Filed: Apr. 26, 2019

(86) PCT No.: PCT/ES2019/070282
§ 371 (c)(1),
(2) Date: Oct. 27, 2020

(87) PCT Pub. No.: WO2019/207192
PCT Pub. Date: Oct. 31, 2019

(65) Prior Publication Data
US 2021/0243545 A1 Aug. 5, 2021

(30) Foreign Application Priority Data
Apr. 27, 2018 (EP) .................................. 18382291

(51) Int. Cl.
*H04S 7/00* (2006.01)
*G06F 16/635* (2019.01)
*G06F 3/16* (2006.01)
*H04R 5/02* (2006.01)
*H04R 5/04* (2006.01)
*H04S 3/00* (2006.01)

(52) U.S. Cl.
CPC ............. *H04S 7/304* (2013.01); *G06F 3/165* (2013.01); *G06F 3/167* (2013.01); *G06F 16/635* (2019.01); *H04R 5/02* (2013.01); *H04R 5/04* (2013.01); *H04S 3/008* (2013.01); *H04S 7/308* (2013.01); *H04S 2400/11* (2013.01); *H04S 2400/13* (2013.01)

(58) Field of Classification Search
USPC ............ 381/26, 74, 151, 303, 309, 329, 370
See application file for complete search history.

(56) References Cited

U.S. PATENT DOCUMENTS

| 2007/0160218 | A1 | 7/2007 | Jakka et al. | |
|---|---|---|---|---|
| 2011/0106825 | A1* | 5/2011 | Xiang | G06F 16/64 707/756 |
| 2017/0094439 | A1* | 3/2017 | Gao | H04S 7/303 |

OTHER PUBLICATIONS

International Search Report, Jul. 22, 2019.

* cited by examiner

*Primary Examiner* — Yosef K Laekemariam
(74) *Attorney, Agent, or Firm* — Tristan A. Fuierer; Casimir Jones, S.C.

(57) ABSTRACT

The present invention relates to a method for a digital assistant to generate output data, said method being implemented by a computer. Additionally, the invention also relates to a computer program and an electronic device.

13 Claims, 9 Drawing Sheets

DIGITAL ASSISTANT

CROSS-REFERENCE TO RELATED APPLICATIONS

This application is filed under the provisions of 35 U.S.C. § 371 and claims the priority of International Patent Application No. PCT/ES2019/070282 filed on 26 Apr. 2019 entitled "DIGITAL ASSISTANT" in the name of Xabier URIBE-ETXEBARRIA JIMENEZ, which claims priority to European Patent Application No. 18382291.5, filed on 27 Apr. 2018, both of which are hereby incorporated by reference herein in their entirety.

OBJECT OF THE INVENTION

The present invention relates to a method for a digital assistant to generate output data, said method being implemented by a computer.

Additionally, the invention also relates to a computer program and an electronic device in relation to this method, all of which is comprised in the field of digital assistants.

In particular, the present invention allows simulating the positioning of a digital assistant in the space close to a user by means of audio with a three-dimensional effect, wherein said space is considered close to the user provided that it is close enough to the user to enable perceiving the audio.

BACKGROUND OF THE INVENTION

Current digital assistants associated with electronic devices provide help to the users of said devices, automating and performing tasks through user interaction.

The interaction between a digital assistant and a user, which is currently carried out by means of two-way voice interaction, or by means of written text, or through a certain element, such as a button or touch screen present in the device itself, must be an effective one. It is also possible for the digital assistant and the user to interact visually or through an action, such as a user movement.

Therefore, the user sends a specific request to the digital assistant through any of the means that have been described, and the digital assistant attends and responds to said request by sending said response to the user in any of the already mentioned forms (voice interaction, text, actions, etc.).

However, current digital assistants have limitations in communicating with the user, which leads to possible problems in the user's interpretation of the response generated by the digital assistant. For example, the emission of a response by a digital assistant by means of audio or sound messages may involve a loss of both part of the content of the response and part of the sound effects the response may contain during transmission to the user, thereby generating missing information and/or a misinterpretation of the message received by the user. Additionally, this loss of content and/or effects in the message received by the user means that it takes longer for the user to receive and understand the message.

DESCRIPTION OF THE INVENTION

The present invention proposes a solution to the preceding problems by means of a method, implemented by a computer, for a digital assistant to generate output data according to claim 1, a computer program which allows carrying out said method according to claim 10, and an electronic device according to claim 13. Preferred embodiments of the invention are defined in the dependent claims.

A first inventive aspect provides a method implemented by a computer for a digital assistant to generate output data and run by an electronic device,
wherein the method comprises the following steps:
a) receiving input data in the device,
b) in response to said input data, determining if output data including audio with a three-dimensional effect has to be provided,
c) generating output data, wherein if it has been determined that output data including audio with a three-dimensional effect has to be provided, the generation of the output data comprises including audio with a three-dimensional effect in said output data, and
d) emitting the output data,
wherein step b) comprises detecting if there are at least two audio emitters connected to the device, and wherein:
   if there are at least two connected audio emitters, it is determined that output data including audio with a three-dimensional effect has to be provided, and
   if there are less than two connected audio emitters, it is determined that output data including audio with a three-dimensional effect does not have to be provided.

Throughout this document, it will be understood that a digital assistant is an agent which is generated by means of software and interacts with a user, unlike personal assistants which refer to a person or groups of people that allow resolving tasks for a user in person or by means of a remote connection.

The present method is run by an electronic device that receives the corresponding input data, this input data being data containing sufficient information for the digital assistant to generate output data in the form of a response or indications depending on the input data received by the electronic device.

The electronic device can be any personal electronic device, such as a mobile telephone, a tablet, a computer, etc.

In a particular embodiment, the personal electronic device is connected with smart earphones or loudspeakers, or with any smart audio emitter.

In a particular embodiment, the electronic device can be found close to or away from the user.

In a particular embodiment, the input data comprises an information request made by a user, a database query result, information obtained by at least one sensor, and/or a combination of any of the above.

In this sense, the input data can be, for example, the result of a periodic search for new information performed by the electronic device in external databases, such as weather information, sports results, or food recommendations related to the user's tastes and interests. The input data can also be, for example, the result of the automatic reception of new information by the electronic device.

The input data can also be a question, or a query, or an explicit interaction that the user performs with respect to the digital assistant.

In a particular embodiment, the input data comprises data in the form of text, audio, a visual signal, a tactile signal, a sensor signal, and/or metadata.

In this sense, the electronic device can receive input data through a keyboard, a microphone, a touch screen, sensors, or elements which allow entering data or data previously processed and converted into metadata that can be interpreted by the electronic device.

The output data provided by the digital assistant may contain audio with a three-dimensional effect, which will be determined depending on the verification of the existence of two audio emitters connected to the device.

Said verification is performed by the device itself, configured for detecting the wired or wireless connection of at least two audio emitters capable of emitting output data, particularly output data in the form of audio. Said at least two emitters correspond with at least two different playback channels.

The existence of at least two audio emitters connected to the device allows the user to receive the output data including audio with a three-dimensional effect, such that the reception of the message or response emitted by the digital assistant is faster, clearer, and more realistic for the user, said message additionally being more complete.

The inclusion of a three-dimensional effect in audio as part of the output data transmitted by the digital assistant therefore advantageously allows the user to assimilate the message more quickly and it allows the message transmitted through the output data to be more realistic.

The audio with a three-dimensional effect, comprised as part of the output data generated by the method according to the present inventive aspect, allows maintaining all the information which, in the opinion of the digital assistant, must be sent to the user. Possible ambiguities in the information received by the user are therefore prevented, this information being enriched.

In a particular embodiment, the audio with a three-dimensional effect is generated by means of any technique adapted for binaural hearing. In other words, the audio including a three-dimensional effect, where said audio is the output data or part of said generated output data, is generated or configured by means of pre-recorded elements that are pre-recorded with a binaural technique. In a particular example, the pre-recorded elements could also be obtained by means of holophonics.

Binaural audio is that audio which tries to create a three-dimensional sound impression for the user similar to the impression the user will have when he or she is physically present in the place where the sounds are produced. It differs from stereo in that it plays back sound in a range from left to right and in depth, thereby obtaining a three-dimensional sound.

Hearing a sound with binaural effect is achieved by means of imitating the natural auditory signals received by each of the two ears, therefore being a technique which advantageously allows giving a greater impression of space that allows a more realistic and three-dimensional experience, as well as perceiving from where the received sound originates. In other words, the generation of sounds with a three-dimensional effect such that the user can perceive them by means of binaural hearing involves the generation of a sound corrected and adapted to each of the ears, such that the three-dimensional effect implemented therein through different variables allows it to incorporate the effects associated with the position, movement, timbre, and the distance from the sound source to the user. In this sense, the sound received by each ear is corrected or modified differently such that it allows associating an effect which makes the conveyed message more realistic, thereby allowing the user to better understand this message.

Once the need to include audio with a three-dimensional effect in the output data has been determined, the electronic device generates said output data in order to emit and thereby send them to the user as a response to the input data received by the device.

In one embodiment, the audio with a three-dimensional effect originates from a virtual source and the position of said virtual source simulates the position of the digital assistant.

In a particular embodiment, the generation of audio with a three-dimensional effect comprises the step of establishing the initial virtual position from where said audio originates and at least one of the following actions:
  temporarily shifting the phase of the generated audio for the emission thereof by one of the at least two audio emitters, and
  applying an intensity or amplitude difference to the generated audio for the emission thereof by one of the at least two audio emitters.

The audio with a three-dimensional effect comprised in the generated output data is emitted by a virtual sound source.

In order to generate the audio with a three-dimensional effect, it is necessary to establish the spatial situation of the virtual sound source with respect to the two audio emitters, or the initial virtual position of said virtual sound source, from where the generated audio which is transmitted to the two audio emitters originates. Depending on said initial virtual position, the audio generated for each of the two audio emitters is adapted to incorporate the three-dimensional effect.

A virtual audio source which is located at the midpoint of the imaginary line joining the two audio emitters is thereby taken as a reference. Any modification of the situation of said virtual audio source involves the following modifications in the sound wave:
  Temporary phase shift: the audio generated by the source reaches each of the two audio emitters at different times. Therefore, the generation of the audio with a three-dimensional effect involves incorporating a temporary phase shift in said audio, depending on the distance from the audio source to each of the two audio emitters, giving the generated audio a realistic effect. In this case, a source located at a point equidistant from both audio emitters does not incorporate any temporary phase shift in the generated audio. In the event that said point is not equidistant, the temporary phase shift only affects one of the two audio emitters, particularly the one farthest from the source, which the sound reaches later.
  Sound wave intensity or amplitude modification: the intensity or amplitude of the audio generated by the virtual sound source can be modified in two situations. On one hand, the audio reaches the audio emitter that is located farthest from said virtual source with a lower intensity, so the generation of audio with a three-dimensional effect involves modifying the sound wave such that, for each audio emitter, the intensity or amplitude of the wave that must reach same is adjusted. Additionally, the existence of a body located between the two audio emitters causes a variation in the intensity of the audio received by each of the two emitters, particularly, the audio generated by the virtual sound source is modified in the intensity of one or all of the frequencies making up same, thereby causing the generated audio to lose or to reduce or modify the intensity associated with certain frequencies in the reception thereof by one of the two audio emitters. Specifically, in a particular example certain frequencies (for example the highest frequencies) of said audio are lost due to the screen effect caused by the existing body. Therefore, one of the at least two audio emitters receives the generated audio the intensity of which has already been corrected for certain frequencies, attenuating or eliminating these frequencies to incorporate the mentioned screen effect.

Additionally, the sound wave intensity or amplitude can also be modified in the event of moving the virtual audio source away from or closer to the at least two audio emitters.

Additionally, the modification of the situation of a virtual audio source may also involve the need to correct or eliminate certain audio frequencies.

The way to perform these corrections relative to the temporary phase shift, the modification of the intensity, amplitude, or frequency depending on the spatial situation of each of the audio emitters and the sound source, is known.

These actions allow modifying the sound wave associated with the audio to be transmitted in an individual manner, such that said audio includes a three-dimensional effect that allows the user to better understand the message, preventing ambiguities in said message, and to assimilate said message more quickly.

In this sense, once the initial virtual position of the virtual sound source is established, the required corrections are applied on the audio to be transmitted to the user, thereby generating the required three-dimensional effect.

Said applied corrections are known and provide correction factors for the temporary phase shift, intensity, or amplitude and frequency to be considered for each of the at least two audio emitters.

The correction factors are selected depending on the virtual position of the sound source, which is determined in an automatic or predetermined manner, and can be modified during sound emission to give an effect of movement of the digital assistant, the virtual position of said sound source being the desired position for the situation of the digital assistant.

A particular embodiment is based on the reference mentioned for the virtual audio source, the latter being the position of the virtual source in the midpoint of the imaginary line joining the two audio emitters.

From said initial virtual position, it is possible to modify the virtual position following random or predetermined patterns of movement, such that the movement of the digital assistant is simulated. The patterns of movement can also be created considering the different actions of the digital assistant or the input data received by the electronic device.

In order words, by moving the virtual position of the virtual source around the space close to the user, the audio with a three-dimensional effect emitted by said virtual source, and therefore attributed to the digital assistant, is perceived by the user in the same way that he or she would perceive it if an actual sound source were moving around him or her. This is obtained based on corrections applied on the generated audio depending on the position of the virtual sound source at all times.

In a particular embodiment, the patterns of movement of the virtual sound source are made conditional to the situation of other sound sources of the environment, input data received by the electronic device, or output data that has to be generated in response to this input data.

In a particular embodiment, the output data comprises one or more components selected from: audio, image, text, augmented content, virtual reality content, or at least one sentence for running internal or external actions relative to the electronic device.

Therefore, step d) of the method object of the first inventive aspect in which the already generated output data is emitted can combine different data formats. In other words, not only can it emit output data in the form of audio through the at least two audio emitters of the device, but the output data can also include, for example, a message or visual signal emitted through a screen, or a sentence which allows performing an action such as switching the electronic device itself on/off.

The augmented content allows combining the image captured by the electronic device with additional information, preferably with additional visual information. This allows providing output data with augmented reality.

In a particular embodiment, the output data comprises a combination of augmented reality and audio with a three-dimensional effect.

The virtual reality content allows simulating visual information as realistically as possible, incorporating this information in this manner to the output data. This allows providing output data with virtual reality.

In a particular embodiment, the output data comprises a combination of virtual reality and audio with a three-dimensional effect.

In a particular embodiment, step c) of this first inventive aspect comprises the following steps:

c1) evaluating the input data received by the electronic device, c2) determining the output data that suits the evaluation of the input data received by said device, and c3) generating the output data that suits the determination of step b) and the evaluation of the received input data.

In other words, the generation of output data by the digital assistant comprises the combination of two evaluations:

A first evaluation run during step b) in which it is determined if it is necessary for the output data to include audio with a three-dimensional effect, such that the message to be transmitted by means of said output data is quickly understood by the user and perceived in a more realistic manner, thereby enriching the message contained in said output data, and A second evaluation relative to the input data received by the electronic device. Said evaluation involves taking into account characteristics relative to the actual message or query implicit in the received input data, and depending on these characteristics, preparing a series of output data either containing or not containing audio with a three-dimensional effect, depending on the result of the first evaluation, which effectively responds to the request related to the input data.

Advantageously, the combination of both evaluations allows the message or response to be transmitted by means of the output data to adjust to the user's needs, and to therefore work together to resolve possible queries that the user may have, or to promptly provide said user with possible information of his or her interest.

In a particular embodiment, step c) of the present inventive aspect comprises evaluating at least one of the following variables: context of the input data, type of information to be provided as output data, spatial position of the electronic device implementing the method, spatial position of a user of the electronic device implementing the method, time, date, background noise in an environment of the electronic device implementing the method. Said evaluated variables allow providing accurate information for determining the output data to be generated.

In other words, depending on the evaluation of the at least one of the preceding variables, the digital assistant allows generating a response that is suitable and consistent with the input data received by the device, in a manner the user considers satisfactory.

In this sense, variables such as the context of the input data allow taking into account the pragmatism of the message or information which is supplied through the input data to the device which implicitly contains the query or interest of the user of the digital assistant.

A combination of all the preceding variables is possible, a more complete combination of information therefore reaching the device as input data for which a response consistent with all the contemplated variables will be determined as output data.

In a particular embodiment, the virtual position of the virtual sound source is updated every time the user performs a movement, particularly every time said movement affects the position in which the at least two audio emitters are located. This movement can be both translational and rotational movement in relation to any of the three axes of the spatial reference system, the new virtual position of the virtual source being recalculated, and applying the required corrections to the generated audio depending on:

the new spatial virtual position of the virtual sound source, and the virtual position of said source in relation to the spatial position of the user.

In a second inventive aspect, the invention provides a computer program comprising program code which, when run in a computer, causes the computer to carry out the steps of the method according to the first inventive aspect.

In this sense, said computer program allows the electronic device to run the steps specified in the method described above.

In a particular embodiment, the program further comprises instructions for querying at least one internal or external database relative to the electronic device.

The electronic device is therefore capable of connecting with internal databases relative to said device, for example, databases stored in a memory, or external databases relative to said device, for example, databases existing via the Internet or in external servers.

In a particular embodiment, the connection of the electronic device to any of said databases is done actively by the user or proactively by the digital assistant.

In a particular embodiment, the program further comprises instructions for using the query result in the generation of the output data. The query result is therefore taken into account as part of the input data received by the electronic device, and it is evaluated together with the other variables for generating a message that suits the user's needs.

In a third inventive aspect, the invention provides an electronic device comprising a processor, a memory that is accessible from the processor, and a program stored in the memory, the program comprising instructions for carrying out a method according to the first inventive aspect, the device further comprising at least one emitter for emitting output data.

In a particular embodiment, the electronic device comprises two audio emitters.

In a particular embodiment, the at least two audio emitters of the electronic device are two earphones. Said earphones are connected with each of the ears of the user.

All the features and/or steps of the methods described in this specification (including the claims, description, and drawings) can be combined in any combination, with the exception of combinations of such mutually exclusive features.

DESCRIPTION OF THE DRAWINGS

These and other features and advantages of the invention will be more clearly understood based on the following detailed description of a preferred embodiment given solely by way of non-limiting illustrative example in reference to the attached drawings.

DETAILED DESCRIPTION OF THE INVENTION

Figure 1:
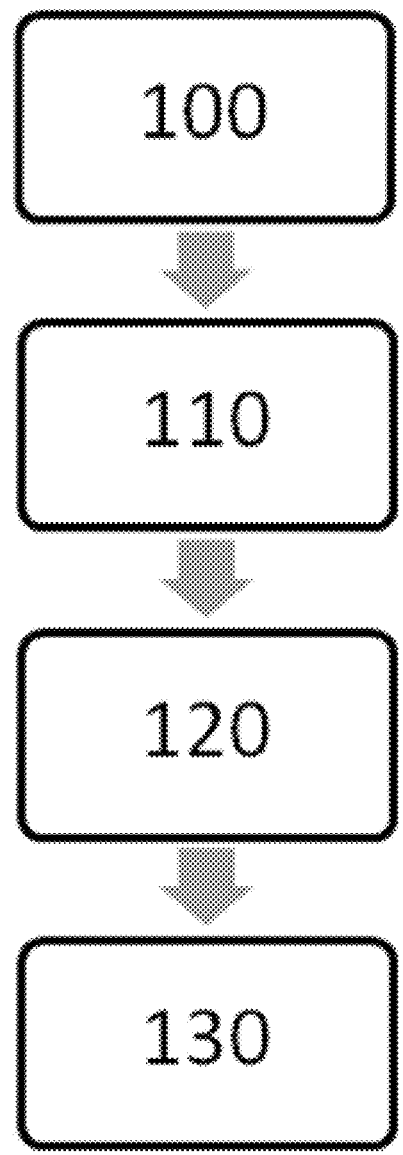
FIG. 1 shows a flow chart of the method for a digital assistant to generate a response according to an embodiment of the first inventive aspect.

FIG. 1 shows a flow chart of the method for a digital assistant to generate output data according to a first inventive aspect.

As shown in FIG. 1, the method comprises a first step (100) of receiving input data in the electronic device.

Once said input data has been received (100), the method performs a determination (110) on the output data to be provided by means of evaluating the input data. The method determines in this second step (110) if the digital assistant must provide the user with output data that includes audio with a three-dimensional effect, or if, in contrast, the provided output data does not have to include audio with said three-dimensional effect.

Once the determination step (110) has been performed, the method performs a third generation step (120) for generating the corresponding output data, including audio with a three-dimensional effect in the event that at least two audio emitters connected to the device have been detected, preferably two earphones that the user wears in his or her ears and allows him or her to perceive the audio with a three-dimensional effect generated as part of the output data in the present generation step (120).

In the event that at least two audio emitters connected to the device have not been detected, the output data can include audio not containing a three-dimensional effect, given that it is not possible for the user to perceive it without having at least two audio emitters that allow transmitting the output data generated in the generation step (120).

Finally, the method comprises a last emission step (140) for emitting output data, in which said output data, with or without audio with a three-dimensional effect, is emitted such that the user can receive it as a response to the input data (100) received in the first step of the method.

Figure 2:
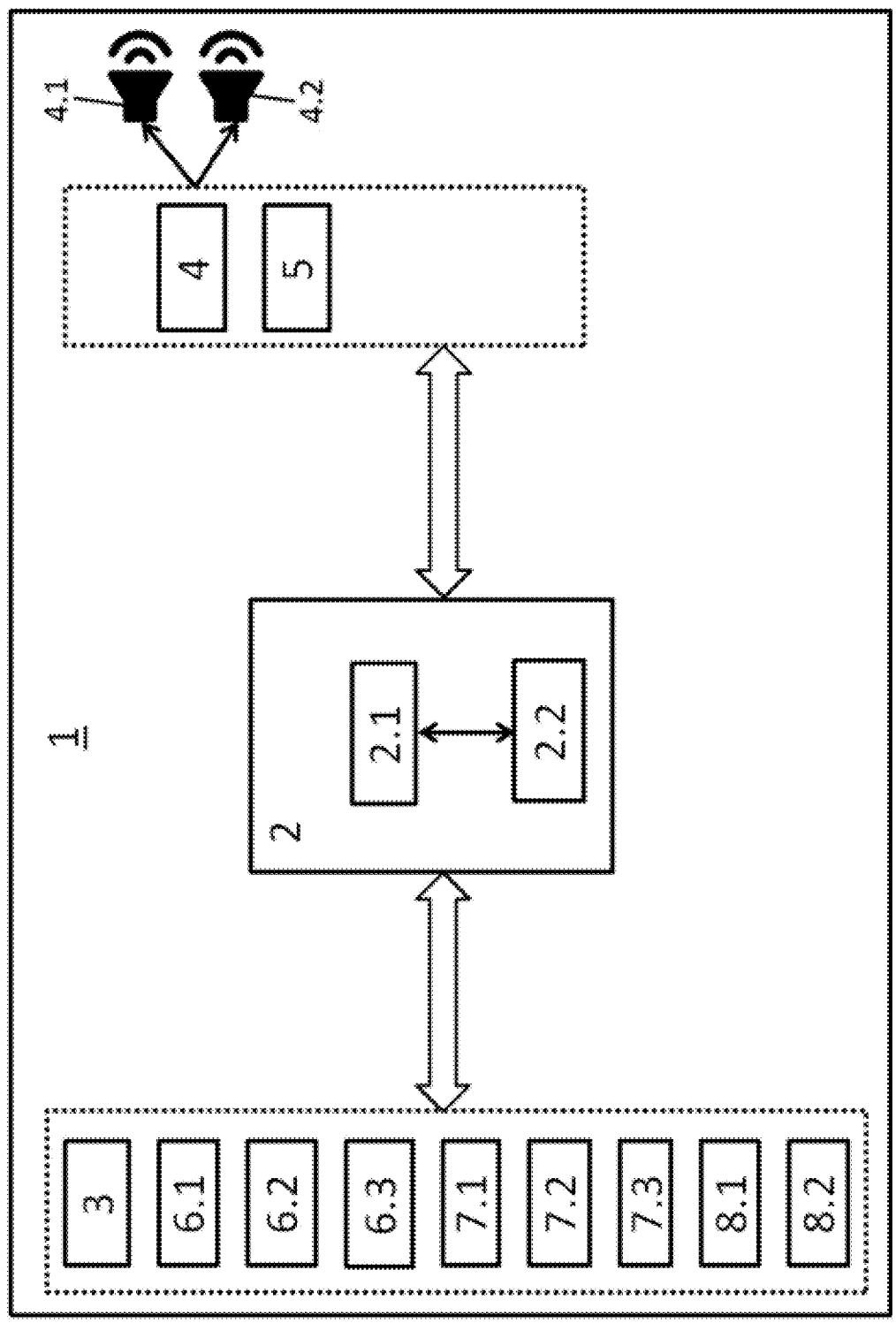
FIG. 2 shows a first example of a device according to a third inventive aspect.

FIG. 2 shows an example of an electronic device (1). Said electronic device (1) comprises elements which allow entering a series of input data in the processing unit (2).

The present electronic device (1) comprises a touch screen (3) which allows the user to enter information through the buttons, keyboard, or corresponding graphic icons.

The electronic device (1) also comprises a series of sensors which allow data input in the processing unit (2).

Said sensors are an image detector (6.1), gesture detector (6.2), and a facial recognition detector (6.3).

The input of this type of data in the processing unit (2) allows the processing unit (2) to determine who the user is, such that the information preferences of the digital assistant are adapted specifically to said user. The same unit also allows detecting gestures.

In this embodiment, the electronic device (1) further comprises sensors of another type, such as an accelerometer (7.1), a gyroscope (7.2), and a proximity detector (7.3), which allow entering in the processing unit (2) data such as the distance from a person to the user of the device (1), the position of the user, and his or her possible movements. The device (1) also contains a GPS which allows precisely determining the positioning coordinates of the user.

Additionally, the electronic device (1) comprises a microphone (8.1) which allows the user to enter voice data in the processing unit (2) as input data to thereby ask the digital assistant questions.

The electronic device (1) additionally comprises an audio direction sensor (8.2) which allows distinguishing sounds made in the direction of the device (1) both by the user and by the persons around or surrounding said user. This sensor (8.2) allows determining the position of the sound source as well as its approximate distance to the sensor (8.2).

The input data (21) can additionally be entered through a keyboard, a pointer, and/or a controller.

The processing unit (2) of the device (1) comprises a processor (2.1) which stores the program whereby the sentences corresponding to the different steps (100 to 140) of the method seen in FIG. 1 are run, and therefore analyzes each of the input data, determining the response required as output data to be emitted to the user.

The processor (2.1) in turn allows coordinating both the data input and the data output corresponding to each input, as well as the connection thereof with external or internal databases relative to the device (1).

The processing unit (2) also comprises a memory (2.2) in which both the internal databases of the device (1) and the digital assistant user data are housed.

Each of the elements which allow entering input data in the processing unit (2) comprises two-way communication with said processing unit (2).

After the processing unit (2) has analyzed the input data, a series of output data which is emitted through earphones (4), particularly two earphones (4.1, 4.2) each located in an ear of the user, is generated. The output data can also be emitted by means of loudspeakers (4).

Figure 3:
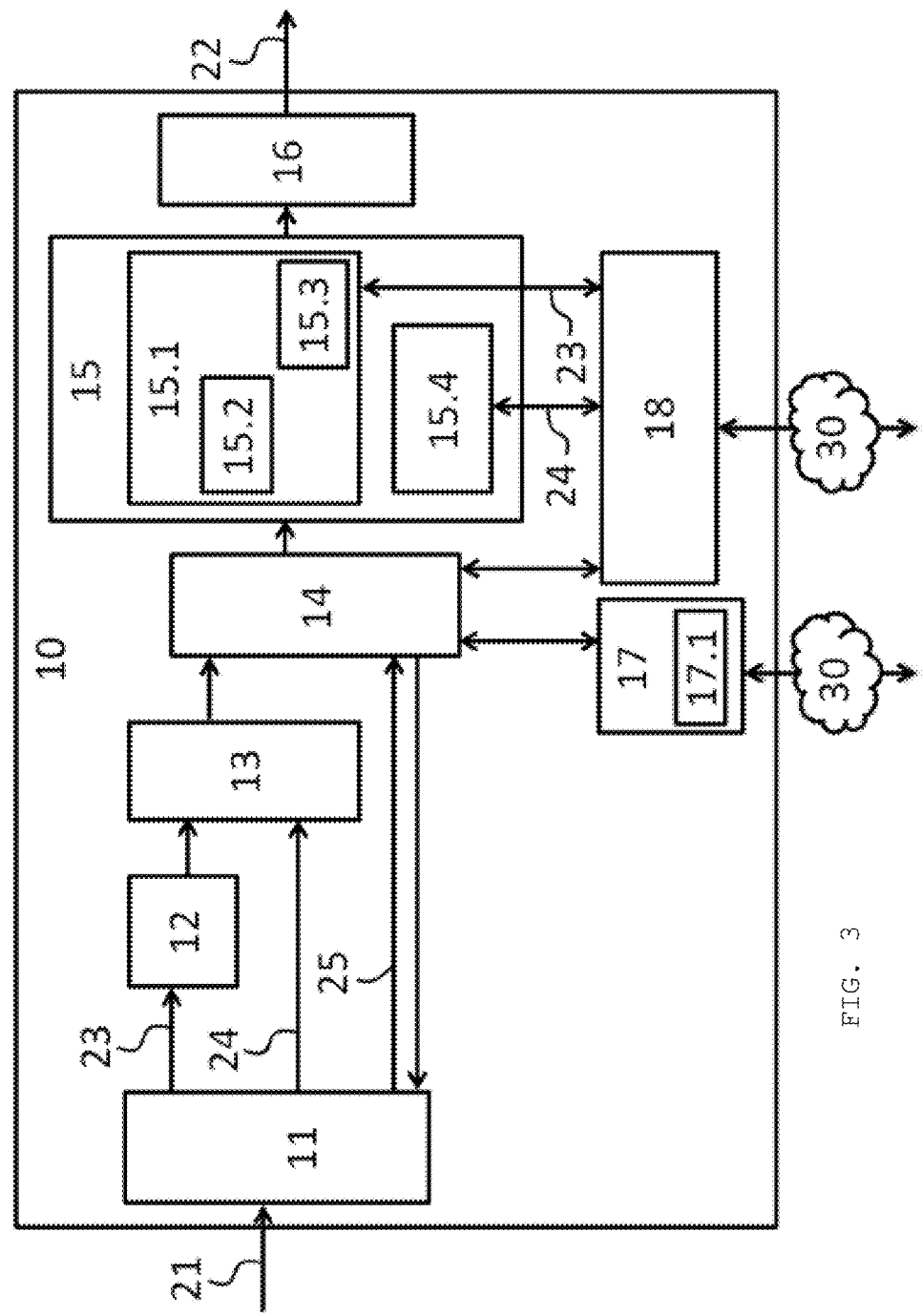
FIG. 3 shows a particular example of the functions of a digital assistant.

FIG. 3 shows a particular example of the functions of a digital assistant (10). This digital assistant (10) can be implemented both in a computer without a network connection and in a computer connected to a computer network.

The present digital assistant (10) comprises an input data receiver module (11) which allows entering input data (21) in the digital assistant (10) in different formats for treatment thereof and for the determination of the suitable response to be generated as output data (22).

The present receiver module (11) sends the received input data (21) in the form of audio (23), text or image (24), or any other format (25) to the processing module (14).

In the case of data in the form of audio (23), this data goes through the audio module (12) and the natural language processing module (13) before being entered in the processing module (14).

The audio module (12) allows translating audio emitted by a user, as well as the possible background noise surrounding said user, into text and/or metadata, such that it is readable for the processing module (14).

Additionally, the audio module (12) also allows recognizing the user emitting the audio received by the digital assistant (10), the assistant (10) preferably containing a list of possible users and their voiceprint.

The natural language processing module (13) allows taking the text and/or metadata obtained by the audio module (12) and disambiguating it, thereby obtaining both the meaning and the intent of the audio message received by the audio module (12), given that, besides the audio emitted by the user, the audio module (12) also allows obtaining contextual information associated with said user. The data obtained by the audio module (12) is disambiguated through semantic, syntactic, lexical, morphological, pragmatic, functional, and emotional analysis, among others.

Additionally, the incoming background sound together with the audio received by the assistant (10) is eliminated without this causing a loss of content of the message introduced in said assistant (10).

Each of the input data (21) duly treated by the receiver module (11), the audio module (12), and the natural language processing module (13), whichever is appropriate, is received by the processing module (14).

This processing module (14) allows managing said data and/or metadata, as well as determining the need to consult with internal and external information services (18), or external or internal databases.

The processing module (14) performs two-way communication with the proactive module (17) comprising a user profile (17.1).

The proactive module (17) can be continuously active and allows, based on a known threshold of certainty, making decisions concerning queries or information it considers relevant for the user. In other words, based on the actions of the user, his or her most relevant information or data such as geolocation, the proactive module (17) allows generating a user profile (17.1) which allows emitting certain relevant information without having to rely on a specific question of the user, but rather automatically based on iterative searches generated by the proactive module (17) itself.

In this sense, the proactive module (17) communicates with the processing module (14), allowing the connection thereof with internal and external information services (18) for the relevant information query.

Depending on said query, the proactive module (17) generates a series of data that will be processed by the processing module (14) and will accordingly give rise to output data (22) that is output to the user in the form of corresponding notifications or actions.

Both the proactive module (17) and the internal and external information services (18) are connected by means of a network (30) with any external element in a wired and/or wireless manner.

The data and/or metadata obtained by the processing module (14) is transferred to the response module (15), which module allows the generation of new data and/or metadata in the form of output data (22) which is emitted to the user by the emitter module (16).

The response module (15) comprises a dialogue module (15.1) which allows generating the required text from the data and/or metadata obtained by the processing module (14) such that the user is capable of receiving output data in the form of a coherent message.

This dialogue module (15.1) in turn comprises a TTS or text-to-speech module (15.2) as well as a sound and effects module (15.3). The TTS module (15.2) converts the text forming the output data (22) into audio message form for the user, whereas the sound and effects module (15.3) generates or obtains the required sounds which allow including a three-dimensional effect in the audio.

The response module (15) additionally comprises a module for generating other responses (15.4) which allows generating, at the same time as the response generated by the dialogue module (15.1), responses of another type, such as visual responses, as well as sentences for running predetermined actions accompanying said response.

Both the dialogue module (15.1) and the module for generating other responses (15.4) allow the connection thereof with internal and external information services (18) such that they can take both audio data (23) and text or images (24) required for generating the corresponding response.

The response module (15) transmits the generated data to the emitter module (16) which in turn emits it to the user through the at least two audio emitters, in this case two earphones placed in the ears of the user, as well as through any other emission means such as a screen, loudspeakers, or in the form of actions run by the electronic device itself or by another device.

In a particular example, the digital assistant (10) also comprises a scripting module (not shown in the drawing) comprised in the response module (15), generating the text required for configuring a message that a user can understand. Said message can be accompanied by sounds, music, or background noise, i.e., sound effects that help the user to better understand the message and are generated by a module other than this scripting module.

Figure 4:
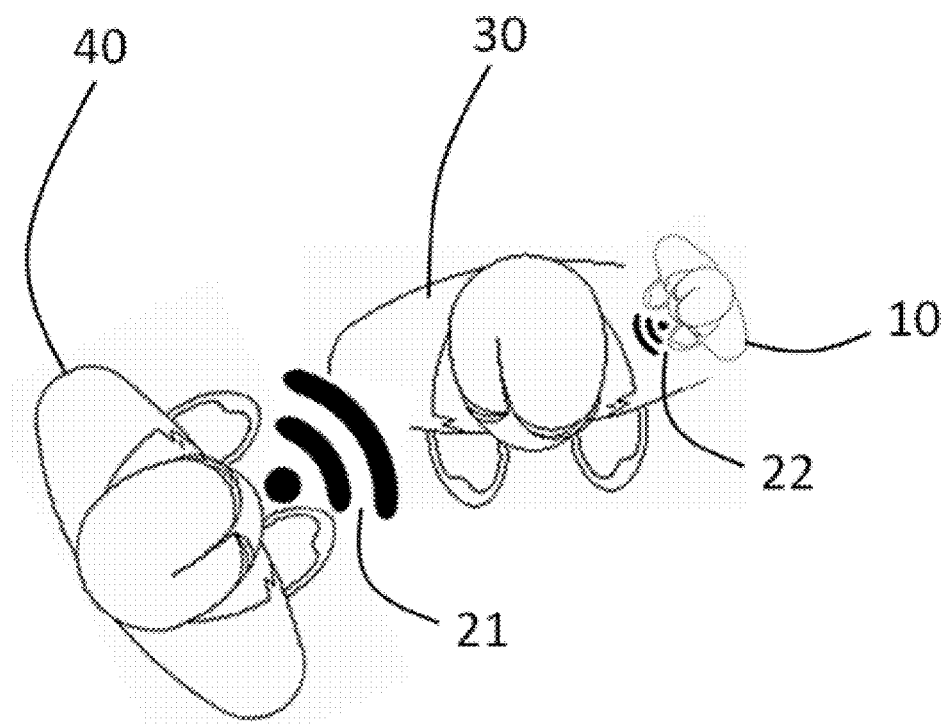
FIG. 4 shows a particular example of the use of a digital assistant.

FIG. 4 shows a particular example of the use of a digital assistant (10).

This drawing shows a situation in which the user (30) of the digital assistant (10) interacts with a person (40).

As seen in the drawing, the person (40) is on the right side of the user (30), therefore emitting sounds which reach the user (30) and the receiver module (11) of the digital assistant (10) on said side.

The digital assistant (10) processes the input data (21) obtained both by the user (30) and by the person (40) speaking, if there is any, and emits a series of output data (22) consistent with the received messages, such as, for example, recognition by means of the voice of the person (40), information relating to his or her message, or information relating to the actual person (40), all this being of interest to the user (30).

The digital assistant (10) emits said output data (22) to the user through the two audio emitters placed in the ears of said user (30) such that the output audio data (22) is emitted with a three-dimensional effect allowing the user (30) to perceive the presence of the digital assistant (10) on the side opposite the side on which the person (40) speaking is located, in this case on the left side.

This prevents the user (30) from confusing the different messages received both from the person (40) speaking and from the digital assistant (10) itself.

The three-dimensional effect included in the audio and emitted as part of the output data (22) also allows the user (30) to better assimilate the message in the cases in which the digital assistant (10) is required for the user (30) to conduct any search or query, as well as in the event that the digital assistant (10) itself, by means of the proactive module (17), allows the emission of output data (22) of interest to the user (30).

Figure 5A:
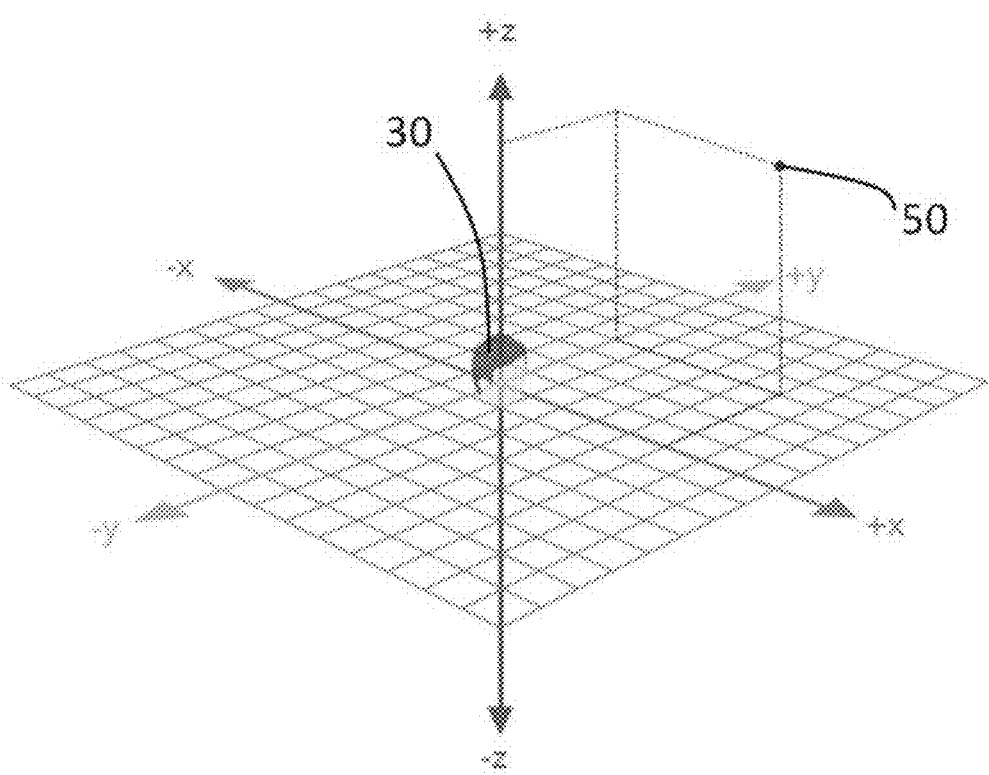
FIGS. 5A and 5B show two examples of the situation of a virtual sound source with respect to a user in relation to the linear position thereof.
Figure 5B:
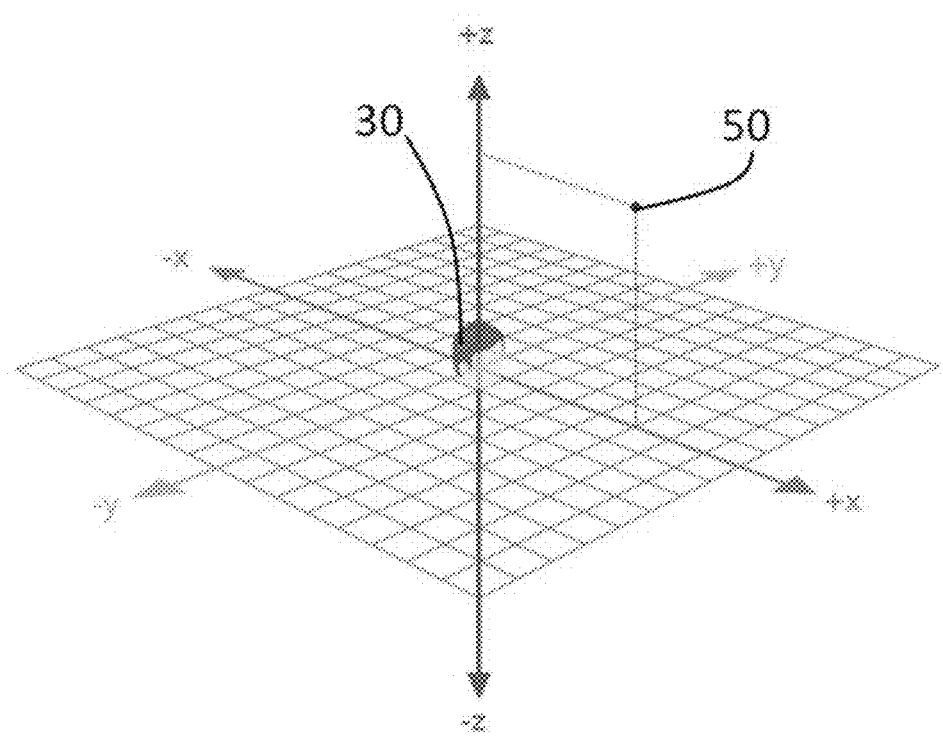

FIGS. 5A and 5B show the spatial situation of a virtual audio source (50) with respect to the position of a user (30).

In the context of the present invention, it is considered that the virtual source (50) is the virtual origin of the sound provided by the digital assistant. Said situation at a specific spatial point influences the message a user (30) receives from said virtual source (50).

FIG. 5A shows a virtual source (50) located at a spatial point away from the two ears of the user (30), so the message emitted by said virtual source (50) and received by the earphones which the user (30) wears in his or her ears is corrected with respect to the temporary phase-shift, amplitude, and intensity.

However, FIG. 5B shows a virtual source (50) located at a spatial point which, although away from the two ears of the user (30), is located at a point equidistant from both ears. Therefore, the message emitted by said virtual source (50) and received by the earphones which the user (30) wears in his or her ears is only corrected with respect to the amplitude and intensity of the wave of the generated audio, and it does not introduce any temporary phase shift as it is equally separated from both ears.

Figure 5C:
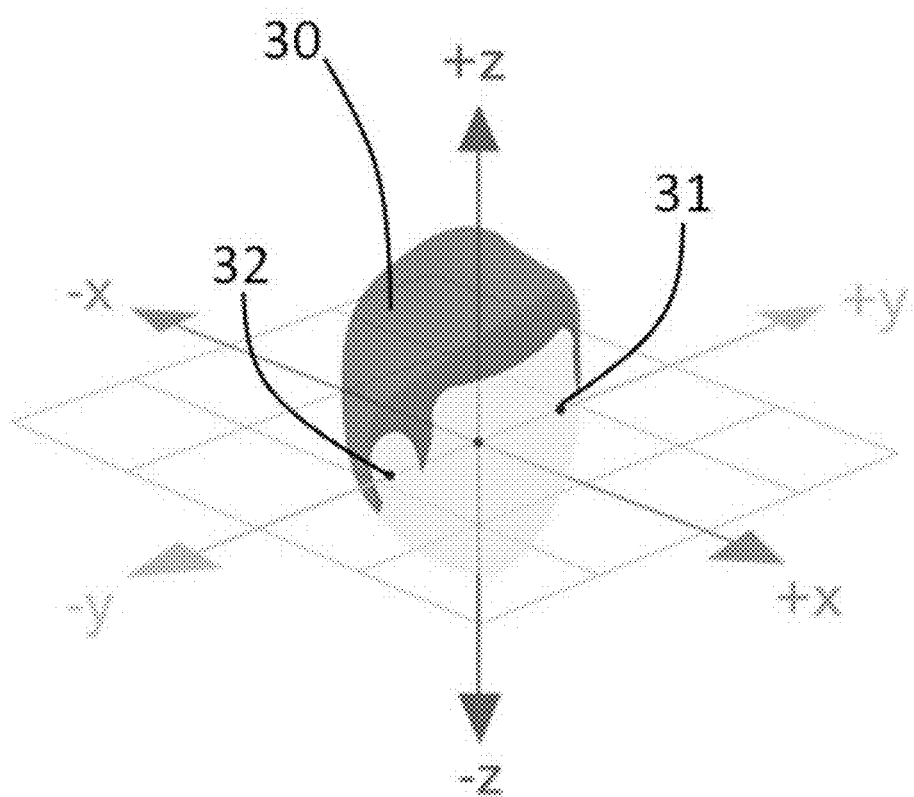
FIG. 5C shows a reference system with respect to a user which will allow the situation of a virtual sound source with respect to a user in relation to the linear position thereof.

FIG. 5C shows a user (30) in which the two end points (31, 32) represent the ears of said user (30). The intermediate point, origin of the Cartesian reference system that is shown, represents the point located on the imaginary line joining both ears (31, 32), such that the +X axis establishes a set of positions equidistant from both ears in which, if a virtual sound source (not shown) is located therein, correction of the audio emitted by said sound source in terms of the temporary phase shift would not be required.

Figure 6A:
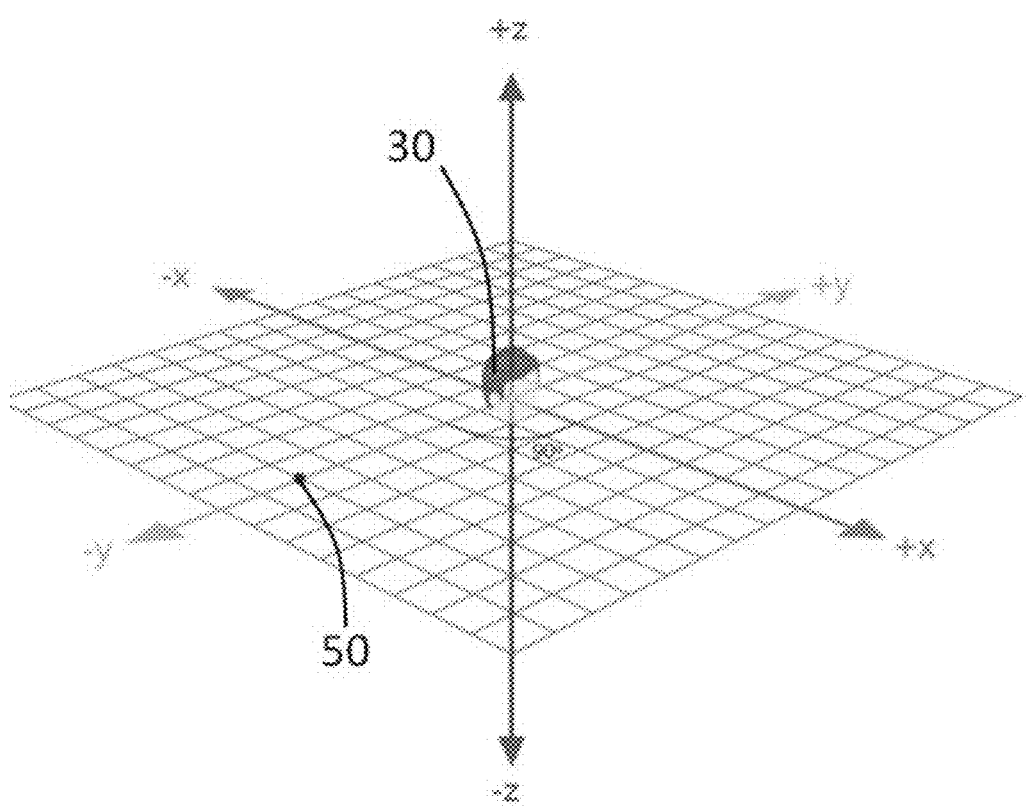
FIGS. 6A and 6B show two examples of the situation of a virtual sound source with respect to a user in relation to the angular position thereof.

FIG. 6A shows a user (30) spatially oriented with respect to a virtual sound source (50). As can be seen, the user is oriented towards the +X direction, with his or her right ear directly facing the virtual sound source (50).

Following the pattern shown in this drawing by means of a curved line, when the user (30) turns his or her head an angle of 90° towards the virtual source (50), the virtual position of said source (50) in relation to the position of the user (30) changes.

Figure 6B:
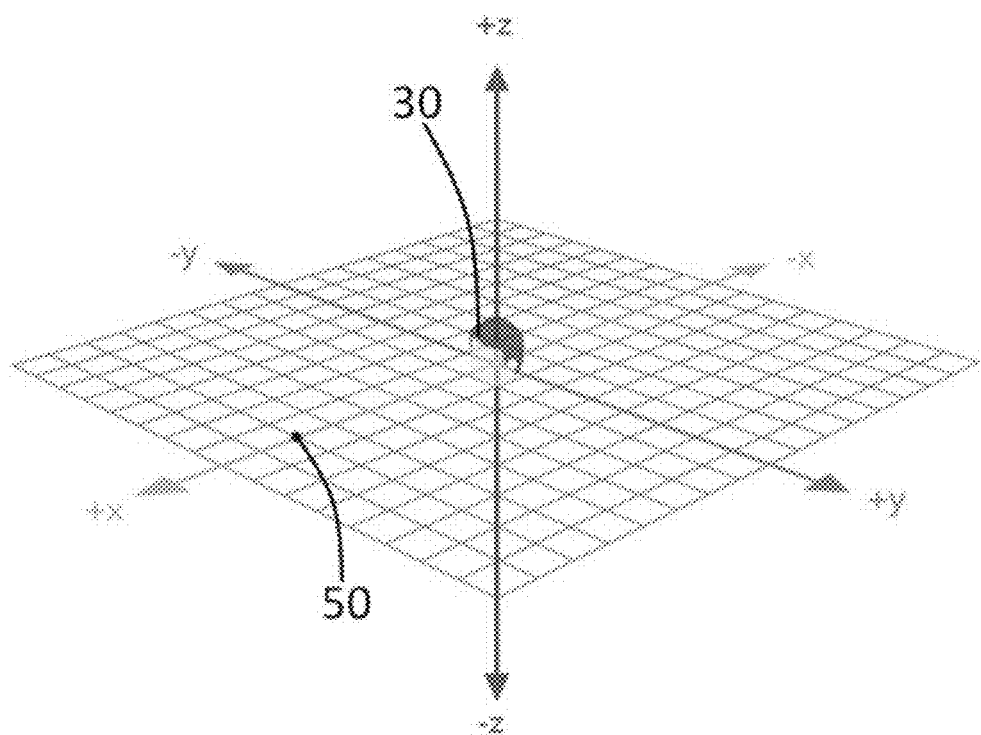

In this sense, as shown in FIG. 6B, the position of the user (30) has changed, and he or she is now directly facing the virtual sound source (50), said virtual source (50) being located at a point equidistant from the two ears of the user (30).

As can be seen, the reference system is modified according to the new position of the user (30), where it is once again oriented towards the +X direction, and the relative position between the user (30) and the virtual sound source (50) changing.

With this modification of the position of the user (30), the digital assistant (not shown):
  modifies its virtual position, and therefore the position of the virtual sound source (50) in a manner similar to the position modification performed by the user (30), i.e., also turning 90° in the same direction as the user (30), or
  maintains its virtual position such that its position in relation to the user (30) is modified.

In the first case, the perception of the user (30) of the sound emitted by the virtual sound source (50) is the same because the source (50) is relocated such that the audio is received by the user in the same manner as in the initial position.

In the second case, the perception of the sound emitted by the virtual sound source (50) is corrected based on the aforementioned variables, so since the position of the virtual source (50) in relation to the user (30) is modified, the sound is perceived differently by the user.

In an additional example not shown in the drawings, the digital assistant allows, by means of the response module, adding sound effects to the output data emitted to the user which already comprises audio with a three-dimensional effect.

Particularly in this example, if the user requests specific information from the assistant, the digital assistant generates output data which corresponds with the requested information provided to the user. However, the digital assistant also additionally incorporates a sound effect to the output data during the search process, such as the noise made by opening filing cabinets, footsteps of the digital assistant, or the noise made by shuffling papers, simulating the search the digital assistant is conducting in parallel. The user thereby receives information continuously from the digital assistant from the time the request is emitted to the time a reply is received from the digital assistant, by means of said sound effects, and receiving the final reply as output data including audio with a three-dimensional effect which also allows the transmitted message to be better understood and enriched, and allows preventing ambiguities of said message.

The invention claimed is:

1. A method implemented by a computer for a digital assistant (10) to generate output data and run by an electronic device (1), wherein the method comprises the following steps:
    a) receiving input data (21) in the electronic device (1),
    b) in response to said input data (21), determining if output data (22) including audio (23) with a three-dimensional effect has to be provided,
    c) generating output data (22), wherein if it has been determined that output data (22) including audio (23) with a three-dimensional effect has to be provided, the generation of the output data (22) comprises including audio (23) with a three-dimensional effect in said output data (22), and
    d) emitting the output data (22),
    wherein step b) comprises detecting if there are at least two audio emitters connected to the electronic device (1), and wherein:
        if there are at least two connected audio emitters, it is determined that output data (22) including audio (23) with a three-dimensional effect has to be provided, and
        if there are less than two connected audio emitters, it is determined that output data (22) including audio (23) with a three-dimensional effect does not have to be provided,
    wherein step c) comprises:
        evaluating the received input data (21),
        determining the output data (22) that suits the evaluation of the received input data (21), and
        generating the output data (22) that suits the determination of step b) and the evaluation of the received input data (21), and
    wherein the audio (23) with a three-dimensional effect originates from a virtual source (50) at a virtual position, the virtual position being the position of said virtual source (50) which simulates the position of the digital assistant (10).

2. The method according to claim 1, wherein step c) comprises evaluating at least one of the following variables: context of the input data (21), type of information to be provided as the output data (22), spatial position of the electronic device (1) implementing the method, spatial position of a user (30) of the electronic device (1) implementing the method, time, date, background noise in an environment of the electronic device (1) implementing the method.

3. The method according to claim 1, wherein the generation of audio (23) with a three-dimensional effect comprises the step of establishing the initial virtual position from where said audio (23) originates and at least one of the following actions:
    temporarily shifting the phase of the generated audio (23) for the emission thereof by one of the at least two audio emitters, and
    applying an intensity or amplitude difference to the generated audio (23) for the emission thereof by at least one of the at least two audio emitters.

4. The method according to claim 1, wherein the output data (22) comprises one or more components selected from: audio, image, text, augmented content, virtual reality content, or at least one sentence for running external actions.

5. The method according to claim 1, wherein the input data (21) comprises an information request made by a user (30), a database query result, information obtained by at least one sensor, and/or a combination of any of the above.

6. The method according to claim 1, wherein the audio (23) with a three-dimensional effect is generated by means of any technique adapted for binaural hearing.

7. The method according to claim 1, wherein the input data (21) comprises data in the form of text, audio, a visual signal, a tactile signal, a sensor signal, and/or metadata.

8. A non-transitory computer-readable storage medium, storing a computer program thereon which, when run in a computer, causes the computer to carry out the steps of the method according to claim 1.

9. The program according to claim 8, further comprising instructions for querying at least one internal or external database relative to the electronic device (1).

10. The program according to any of claim 9 further comprising instructions for using the query result in the generation of the output data (22).

11. An electronic device (1) comprising:
    a processor (2.1),
    a memory (2.2) that is accessible from the processor (2.1), and
    a program stored in the memory (2.2), the program comprising instructions for carrying out a method according to claim 1, and
    at least one emitter for emitting output data (22).

12. The electronic device (1) according to claim 11 comprising two audio emitters.

13. The electronic device according to claim 12, wherein the at least two audio emitters are two earphones (4.1, 4.2).

* * * * *